(12) United States Patent  (10) Patent No.: US 12,456,178 B2
Ericson et al.  (45) Date of Patent: Oct. 28, 2025

(54) SELF-LEARNING DISTORTION CORRECTION

(71) Applicant: Axis AB, Lund (SE)

(72) Inventors: Joakim Ericson, Lund (SE); Song Yuan, Lund (SE); Johan Stening, Lund (SE)

(73) Assignee: AXIS AB, Lund (SE)

( * ) Notice: Subject to any disclaimer, the term of this patent is extended or adjusted under 35 U.S.C. 154(b) by 344 days.

(21) Appl. No.: 18/326,555

(22) Filed: May 31, 2023

(65) Prior Publication Data

US 2024/0005460 A1 Jan. 4, 2024

(30) Foreign Application Priority Data

Jun. 29, 2022 (EP) ..................................... 22181939

(51) Int. Cl.
*G06T 5/00* (2024.01)
*G06T 5/50* (2006.01)
*G06T 5/80* (2024.01)

(52) U.S. Cl.
CPC . *G06T 5/80* (2024.01); *G06T 5/50* (2013.01)

(58) Field of Classification Search
CPC .................... G06T 5/80; G06T 5/50
See application file for complete search history.

(56) References Cited

U.S. PATENT DOCUMENTS

| 2013/0201300 | A1* | 8/2013 | Matsuda | G03B 17/565 |
| | | | | 348/49 |
| 2020/0027218 | A1* | 1/2020 | Buibas | G06V 40/103 |
| 2020/0111250 | A1 | 4/2020 | Huang et al. | |
| 2021/0005675 | A1 | 1/2021 | Li | |
| 2021/0127059 | A1* | 4/2021 | Powell | G06T 5/80 |
| 2022/0191463 | A1 | 6/2022 | Kim et al. | |

FOREIGN PATENT DOCUMENTS

| JP | 6577557 B2 | 9/2019 |
| JP | 2020-154552 A | 9/2020 |
| WO | 2020/254448 A1 | 12/2020 |

(Continued)

OTHER PUBLICATIONS 1990-2023 IP.com.*

(Continued)

*Primary Examiner* — Quang N Vo
(74) *Attorney, Agent, or Firm* — Volpe Koenig (57) ABSTRACT

A method of distortion correction in an image captured by a non-rectilinear camera includes obtaining multiple images of a scene captured by the camera over time, determining where bottom portions of objects having moved over a horizontal surface in the scene are located in the images, determining a boundary of the horizontal surface in the scene based on the determined locations of the bottom portions, generating a three-dimensional model of the scene by defining one or more vertical surfaces around the determined boundary of the horizontal surface of the scene, and correcting a distortion of at least one of the images by projecting the image onto the three-dimensional model of the scene. A corresponding device, computer program and computer program product are also provided.

16 Claims, 5 Drawing Sheets

(56) References Cited

FOREIGN PATENT DOCUMENTS

WO 2022/238933 A1 11/2022

OTHER PUBLICATIONS

Communication pursuant to Article 94(3) EPC dated Jul. 28, 2023 for European Patent Application No. 22181939.4.
Extended European Search Report issued on Nov. 28, 2022 for European Patent Application No. 22181939.4.
Meng et al., "Distortion Aware Room Layout Estimation from a Single Fish Eye Image", Paper, Institute of Computing Technology, Chinese Academy of Sciences, Beijing, China (2021).

* cited by examiner

SELF-LEARNING DISTORTION CORRECTION

TECHNICAL FIELD

The present disclosure relates to distortion correction of images of a scene. In particular, the present disclosure relates to self-learning distortion correction of images captured by a camera having a non-rectilinear lens, such as e.g. a fisheye lens.

BACKGROUND

In many situations, it is desirable that a single camera is able to capture a larger part of a scene, and a wide-angle lens can be used for this purpose. Such wide-angle lenses are often non-rectilinear and thereby produce strong optical distortion of the image, such that lines or other objects in the scene which are straight end up being curved or warped in an image of the scene captured using such a lens. One example of a non-rectilinear lens is a so-called fisheye lens, which is capable of producing e.g. a hemispherical image of a scene, and which often has a wide angle of view exceeding e.g. 90 degrees, 180 degrees or even 270 degrees.

One example of a situation as described above is a monitoring camera mounted in e.g. a ceiling of a room, and configured to capture most or all of the room below the ceiling using a fisheye lens. By being able to capture more of what is happening around the camera, such cameras provide an improved situational awareness compared to e.g. regular pan/tilt/zoom (PTZ) cameras.

However, as mentioned above, one disadvantage of cameras having such non-rectilinear lenses is that the images which they produce are distorted (e.g. warped). Although there exist for example various solutions for digitally "de-warping" images captured through e.g. a fisheye lens, such solutions often require manual adjustment of a plurality of parameters before the obtained result is satisfying enough. In addition, in an installation including many such cameras, the manual labor required to adjust the de-warping parameters for each camera may quickly become time-consuming.

Consequently, there is therefore a need for an improved way of facilitating the use of non-rectilinear lenses in e.g. monitoring camera installations.

SUMMARY

To at least partially satisfy the above-identified need, the present disclosure provides an improved method of distortion correction in an image of a scene captured by a camera having a non-rectilinear lens, a device configured to perform such a method, and a computer program and computer program product as defined in the accompanying independent claims. Various embodiments of the improved method, device, computer program and computer program product are defined in the accompanying dependent claims.

According to a first aspect of the present disclosure, there is provided a method of distortion correction in an image of a scene captured by a camera having a non-rectilinear lens. The method includes i) obtaining multiple images of the scene captured by the camera over time. The method further includes ii) determining where bottom portions of one or more objects having moved over a horizontal surface in the scene are located in at least some of the multiple images. The method further includes iii) determining a boundary of the horizontal surface in the scene based on the determined locations of the bottom portions. The method further includes iv) generating a three-dimensional (3D) model of the scene by defining one or more vertical surfaces around the determined boundary of the horizontal surface. The method further includes v) correcting a distortion of at least one of the multiple images by projecting the at least one image onto the three-dimensional model of the scene. The method may for example be implemented on a device/computer, such as e.g. a device including processing circuitry.

As used herein, a "horizontal surface" is e.g. a floor or ground of the scene, or any other surface on/across which e.g. people, animals or other objects normally walk/move. Likewise, a "vertical surface" is e.g. a wall or other surface which are arranged around a periphery of the horizontal surface, such as e.g. walls surrounding a floor of a room, and which often extends perpendicular to the floor. The term "bottom portions" can for example include feet (of animals or persons), wheels (of e.g. robotic vacuum cleaners, or similar), or any other part of an object which comes into contact with the horizontal surface when the object moves in the scene.

Using a room as an example of a scene, conventional solutions for distortion correction of images of the room often requires an operator/user to manually indicate which parts of an image of a room that belong to a floor of the room, and which parts of the image that belong to vertical surfaces (such as e.g. walls) of the room, in order to build a sufficient 3D model of the room required for the distortion correction. The solution of the present disclosure improves upon such conventional technology by using a realization that bottom portions (such as e.g. feet) of objects moving in the scene often come into contact with the floor, and that an extension/boundary of the floor may thus be learned/approximated by checking how the bottom portions move in the image of the room over time. By assuming that other parts of the image not lying within this extension/boundary are instead parts of e.g. walls, the 3D model of the room can be built automatically and without the need for manual segmentation of the image. As mentioned earlier herein, this may be particularly useful in larger installations of multiple cameras, as each camera may, using the solution of the present disclosure, self-learn how to model the room and then do the required distortion correction.

In some embodiments of the method, the non-rectilinear lens (of the camera) may be a fisheye lens.

In some embodiments of the method, the bottom portions may include feet of the objects (such as feet of humans, or feet of animals).

In some embodiments of the method, the step ii) may include identifying one or more keypoints of the one or more objects. As used herein, a "keypoint" may e.g. be an identified foot, knee, leg, or any other feature of an object in an image, and the location of the actual foot may be estimated based on the positions of these keypoints. For example, if knowing where e.g. a knee and/or hip of a person sitting in a sofa are/is located, the position of the foot may be calculated even if the foot is not visible in the image of the scene. This may be a likely scenario if there is e.g. a table placed in front of the sofa, and allows the position of the foot to be inferred anyways, and used to determine the boundary of the floor.

In some embodiments of the method, the scene may be a scene of a room, and the horizontal surface may be a floor of the room.

In some embodiments of the method, at least some of the multiple images may be captured during a training period, and an area of the at least some of the multiple images may be considered to belong to the horizontal surface of the scene if a number of bottom portions having moved in the area during a finite time interval exceeds a threshold value. Requiring the detection of multiple bottom portions in a same area before classifying the area as part of the horizontal surface of the scene may e.g. improve confidence that the area is in fact part of the horizontal surface.

In some embodiments of the method, the three-dimensional model may include a horizontal surface bounded by the determined boundary, and the one or more vertical surfaces may project in a direction perpendicular to the horizontal surface. For example, the horizontal surface may be a floor of a room, and the vertical surfaces may be (surfaces of) walls arranged as usually within a room, such that the walls form 90-degree angles with the floor.

In some embodiments of the method, if the scene is of a room, the camera may be arranged in a ceiling of the room. The camera may e.g. be arranged such that its optical axis faces directly towards the floor, e.g. if the ceiling extends in a plane parallel with the plane of the floor, such that e.g. the optical axis of the camera is perpendicular to the plane of the floor (or horizontal surface).

According to a second aspect of the present disclosure, there is provided a device for distortion correction in an image of a scene captured by a camera having a non-rectilinear lens. The device includes processing circuitry. The processing circuitry is configured to cause the device to: i) obtain multiple images of the scene captured by the camera over time; ii) determine where bottom portions of one or more objects having moved over a horizontal surface in the scene are located in at least some of the multiple images; iii) determine an outer boundary of the horizontal surface of the scene based on the determined locations of the bottom portions; iv) generate a three-dimensional (3D) model of the scene by defining one or more vertical surfaces around the determined boundary of the horizontal surface of the scene, and v) correct a distortion of at least one of the multiple images by projecting the at least one image onto the three-dimensional model of the scene. The device is thus configured to perform the steps of the method of the first aspect. The device may e.g. include a memory storing instructions that, when executed by the processing circuitry of the device, causes the device to do the above recited steps i) to v). That the device is "configured to" perform the above steps i) to v) thus means, in such an embodiment, that the processing circuitry is configured to read and execute the instructions stored in the memory.

In some embodiments of the device, the processing circuitry is further configured to cause the device to perform an embodiment of the method of the first aspect discussed and disclosed herein.

In some embodiments of the device, the device may be the camera having the non-rectilinear lens, such as e.g. a fisheye lens camera or similar.

According to a third aspect of the present disclosure, there is provided a computer program for distortion correction in an image of a scene captured by a camera having a non-rectilinear lens. The computer program includes computer code that, when running on processing circuitry of a device, causes the device to: i) obtain multiple images of the scene captured by the camera over time; ii) determine where bottom portions of one or more objects having moved over a horizontal surface in the scene are located in at least some of the multiple images; iii) determine an outer boundary of the horizontal surface of the scene based on the determined locations of the bottom portions; iv) generate a three-dimensional (3D) model of the scene by defining one or more vertical surfaces around the determined boundary of the horizontal surface of the scene, and v) correct a distortion of at least one of the multiple images by projecting the at least one image onto the three-dimensional model of the scene. The computer code is thus such that it causes the device to perform the steps of the method of the first aspect.

In some embodiments of the computer program, the computer code may be further such that it, when running on the processing circuitry of the device, causes the device to perform any embodiment of the method of the first aspect as discussed and disclosed herein.

According to a fourth aspect of the present disclosure, there is provided a computer program product. The computer program product includes a computer-readable storage medium, on which a computer program according to the third aspect (or any embodiment thereof discussed and disclosed herein) is stored. As used herein, the computer-readable storage medium may e.g. be non-transitory, and be provided as e.g. a hard disk drive (HDD), solid state drive (SDD), USB flash drive, SD card, CD/DVD, and/or as any other storage medium capable of non-transitory storage of data. In other embodiments, the computer-readable storage medium may be transitory and e.g. correspond to a signal (electrical, optical, mechanical, or similar) present on e.g. a communication link, wire, or similar means of signal transferring.

Other objects and advantages of the present disclosure will be apparent from the following detailed description, the drawings and the claims. Within the scope of the present disclosure, it is envisaged that all features and advantages described with reference to e.g. the method of the first aspect are relevant for, apply to, and may be used in combination with also the device of the second aspect, the computer program of the third aspect, and the computer program product of the fourth aspect, and vice versa.

BRIEF DESCRIPTION OF THE DRAWINGS

Exemplifying embodiments will now be described below with reference to the accompanying drawings, in which.

In the drawings, like reference numerals will be used for like elements unless stated otherwise. Unless explicitly stated to the contrary, the drawings show only such elements that are necessary to illustrate the example embodiments, while other elements, in the interest of clarity, may be omitted or merely suggested. As illustrated in the Figures, the (absolute or relative) sizes of elements and regions may be exaggerated or understated vis-à-vis their true values for illustrative purposes and, thus, are provided to illustrate the general structures of the embodiments.

DETAILED DESCRIPTION

Figure 1A:
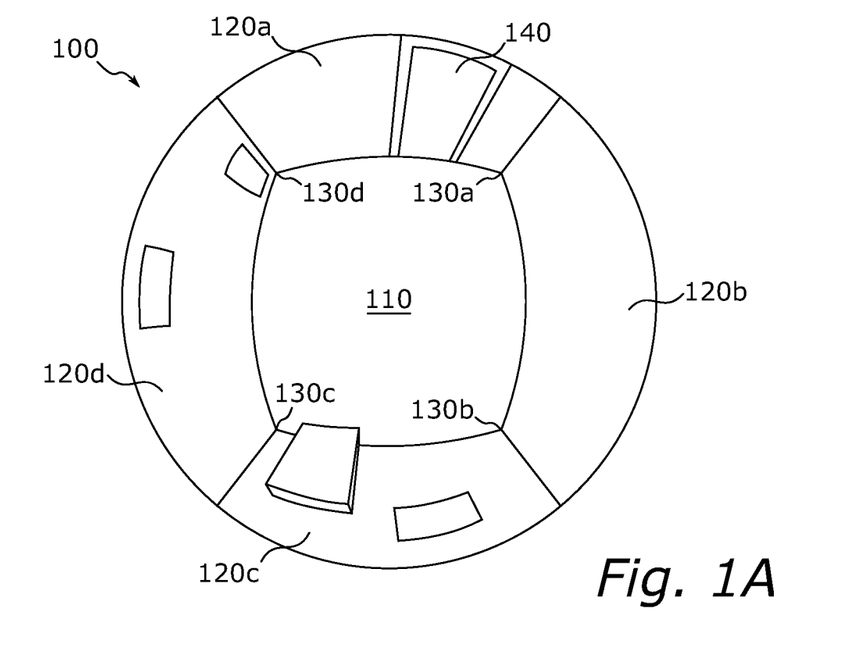
FIG. 1A schematically illustrates an image of a scene/room captured by a camera having a non-rectilinear lens.

FIG. 1A schematically illustrates an image 100 of a scene. The scene, in this particular example, is of a room. The image 100 has been captured by a camera which has a non-rectilinear lens (such as e.g. a fisheye lens), the image 100 is thus warp such that straight lines are shown as curved lines, etc. The camera is envisaged as being mounted in a ceiling (not shown) of the room, and arranged with its optical axis facing directly towards a floor 110 of the room. The floor 110 is surrounded by four walls 120a-d, which project perpendicularly upwards from the floor 110 and are such that they form four corners 130a-d at locations where the floor 110 and respective walls meet. There is also a door 140 provided in the wall 120a, through which door objects may enter/exit the room. At the moment the image 100 was captured, the room was empty (except for e.g. furniture, wall decorations, or similar), i.e. there were no persons, animals or other mobile objects within the room.

As can be seen in the image 100, the lines joining the corners together along the floor 110 appear to be curved/warped, due to the projection of the non-rectilinear lens of the camera on the image sensor of the camera. This applies also to most other lines in the image 100, which are warped/curved in the image 100 due to the distortion introduced by the lens of the camera. There is therefore a desire to correct for such distortion, such that e.g. lines which are straight in the real world remains straight also in an image depicting the scene. Using conventional technology, in order to correct for the distortion in the image 100 introduced by the non-rectilinear lens of the camera, an operator would have to manually identify which part of the image 100 that belongs to the floor 110 (i.e. the horizontal surface of the scene shown in the image 100). For example, the operator may perform such a task by (using a graphical user interface showing the image 100) e.g. tracing along the curved lines joining the four corners 130-d, and/or by manually indicating e.g. the area of the image 100 corresponding to the four walls 120a-d and the door 140, i.e. the vertical surfaces of the scene. In general, such a process is time-consuming, and potentially not even tractable if there are many (e.g. hundreds) of cameras that are to be configured and prepared for distortion correction in a larger camera installation.

How the present disclosure solves this problem/issue will now be described in more detail with reference to the remaining Figures, starting by referring first to FIG. 1B. In what follows, the terms "scene" and "room" will be used interchangeably. The same applies also to the terms "vertical surface" and "wall", as well as to the terms "horizontal surface" and "floor", which will be used interchangeably as well.

Figure 1B:
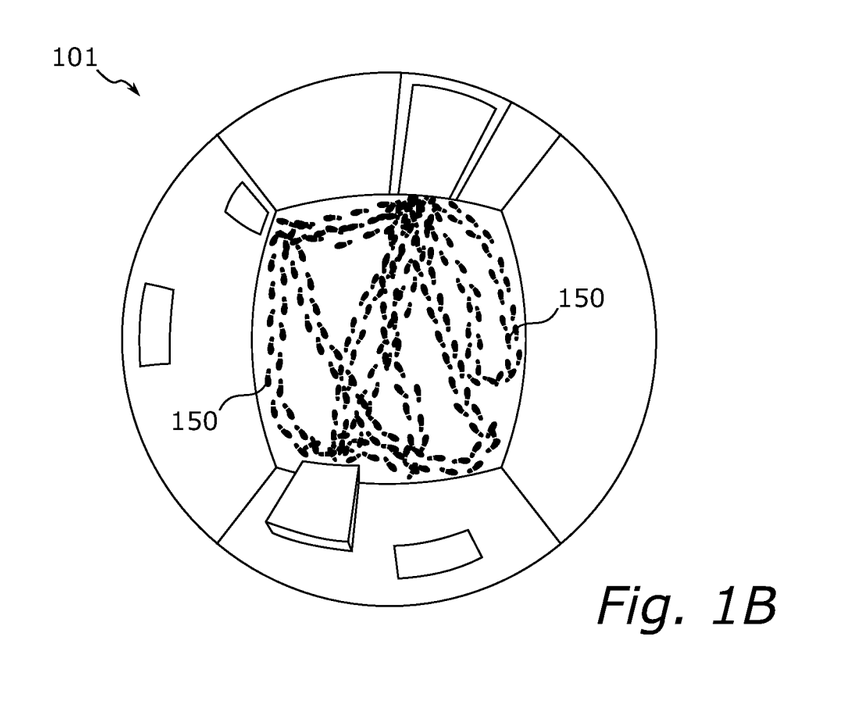
FIG. 1B schematically illustrates a determining of bottom portions of objects having moved in the scene of FIG. 1A, as performed in various embodiments of a method according to the present disclosure.

FIG. 1B schematically illustrates an overlay of multiple images 101 of the room captured over time, wherein a plurality of footprints 150 indicate where bottom portions of one or more objects having moved over a horizontal surface/floor in the scene have been located. From image 101, it is for example apparent that one or more objects have entered through the door 140 and moved to an object in the room (such as a cabin, wall, or similar), and then exited through the door 140 again. It should be noted that the footprints 150 may not necessarily be actual footprints left after persons (as caused e.g. by dirt under shoes, rubber markings, or similar), but instead serve to illustrate/symbolize where the bottom portions (such as e.g. feet) of these objects have been determined over time. Keypoint detection may e.g. serve as one possible means to estimate where such bottom portions of objects are located in an image. If a person or other object actually leaves real footprints (e.g. dirt/rubber markings) on the floor 11o while moving, these may of course also be detected and used as indications of where the bottom portions of such objects are located in the images.

With reference also to FIGS. 1C to 1H, it will now be explained how envisaged method uses the multiple images 101 and the "footprints" 150 to, in the end, perform distortion correction of one or more of the images 101.

Figure 1C:
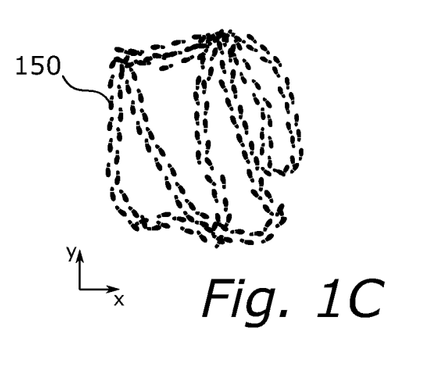
FIGS. 1C to 1G schematically illustrate various steps of generating a 3D model of the scene of FIG. 1A based on the determined bottom portions of FIG. 1B, as performed in various embodiments of a method according to the present disclosure.

FIG. 1C schematically illustrates how the bottom portions have moved in the scene over time, using the footprints 150 for illustration. The footprints 150 are plotted in an (x,y)-coordinate system, such that each footprint 150 is located at a particular (x,y)-coordinate.

Figure 1D:
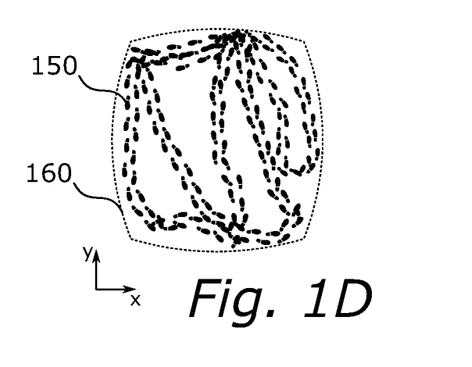

FIG. 1D schematically illustrates the same footprints 150 as in FIG. 1C, but with a dashed shape 160 indicating the extension of the footprints in a plane of the floor 110.

Figure 1E:
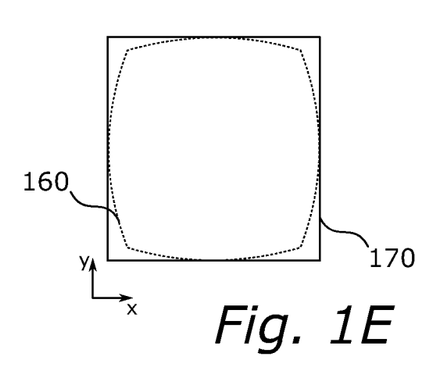

FIG. 1E schematically illustrates how, based on known parameters of the camera, a rectangular boundary 170 is defined based on the extension 160 of the footprints 150. This may e.g. be done based on knowledge about how the non-rectangular lens refracts light originating from different angles. For e.g. a fisheye lens, how the lens refracts the light is based on a distance between a pixel (on the image sensor of the camera used to capture the image of the scene) and an optical center of the lens (a center from which an optical axis of the lens/camera extends), and may not require e.g. knowledge about an installation height of the camera above the floor 110. The boundary 170 may e.g. be found by correcting for such refraction for all footprints 150, or e.g. only for the outermost footprints 150. The important thing is not exactly how this is done, but that the determined locations of the footprints 150 in the images of the scene are used to tell that these locations correspond to the floor 110, and not to e.g. any one of the walls 120a-d.

Figure 1F:
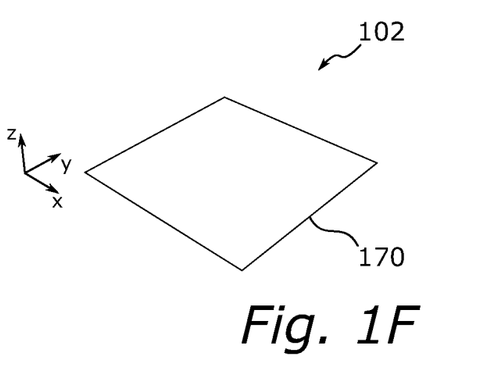

FIG. 1F schematically illustrates how, after having identified the boundary 170, the boundary 170 is used as a horizontal surface of a three-dimensional model 102. As shown in FIG. 1F, the three-dimensional model 102 is unfinished, and needs to be completed with one or more vertical surfaces.

Figure 1G:
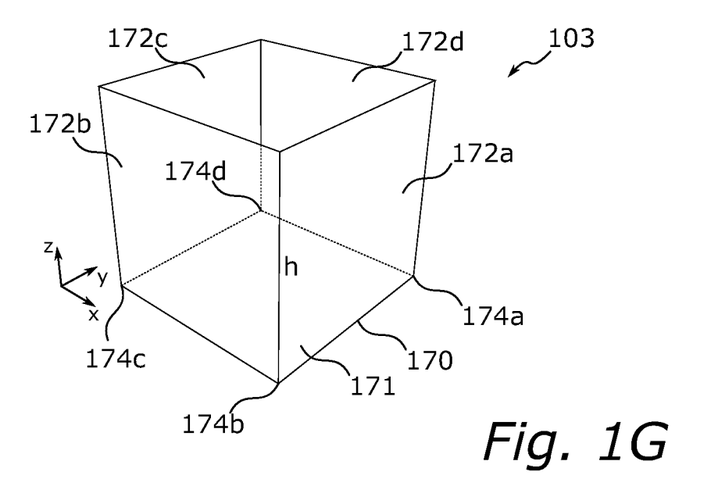

FIG. 1G schematically illustrates the completion of the three-dimensional model 102 in order to form a completed three-dimensional model 103. In the model 103, vertical surfaces in form of walls 172a-d have been added/defined, such that the walls 172a-d are defined around the boundary 170. In the example shown in FIG. 1G, the walls 172a-d are added such that they extend perpendicularly away from the plane of the boundary 170, i.e. in a positive z-direction as shown in FIG. 1G. In the example shown in FIG. 1G, the three-dimensional model 103 thus includes a floor 171 bounded by the boundary 170, and the four walls 172a-d which intersects each other and the floor 171 at four corners 174a-174d. The walls 172a-d have a same height h. As mentioned earlier, the three-dimensional model 104 is thus created under the assumption that areas of an image in which objects have not moved are statistically likely to belong to e.g. walls of a room. The parameter h may be tuned as desired to emulate a height of e.g. the room.

Figure 1H:
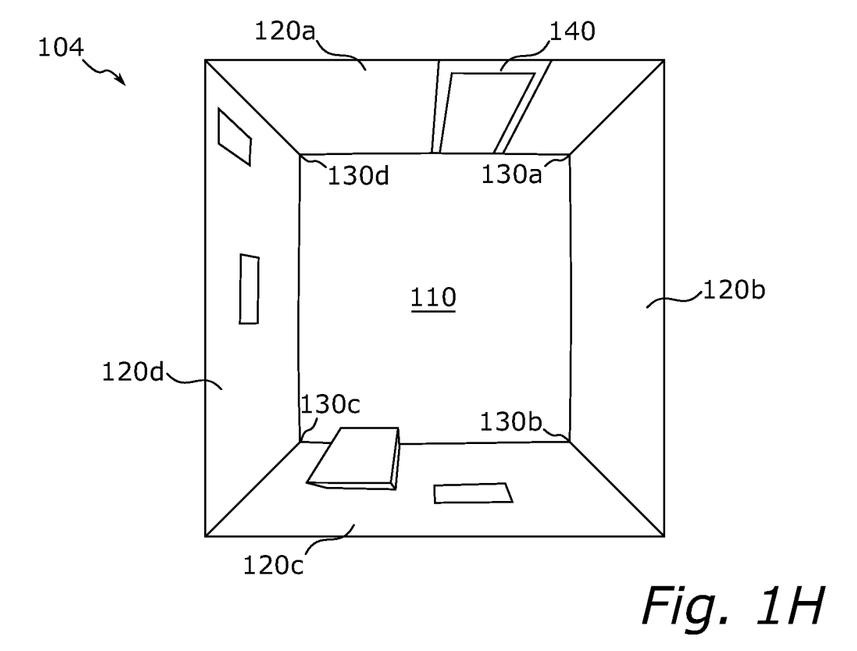
FIG. 1H schematically illustrates a distortion corrected image of the scene of FIG. 1A, as generated by various embodiments of a method according to the present disclosure.

FIG. 1H schematically illustrates once again a top-view of the room, but where the image 100 of FIG. 1A has now been projected on the three-dimensional model 103. The resulting image 104 is a distortion corrected version of the image 100, as can be seen from that e.g. the lines joining the four corners 130*a*-*d* are no longer as warped/curved as before.

As envisaged herein, performing the projection of the image 100 onto the three-dimensional model 103 may e.g. be based on knowledge about an orientation between the floor 171 and the camera, which may e.g. be obtained by assuming that the optical axis of the camera/lens is orthogonal to the floor 171. The assumed position of the camera when performing the projection of the image 100 onto the three-dimensional model 103 may on purpose be changed from its true location, e.g. to correct for the camera not being exactly centered within the ceiling of the room, or similar. Changing the assumed position of the camera may e.g. help to obtain a similar number of pixels on both sides (horizontal and/or vertical) of the resulting image 104. It is also envisaged that in some embodiments, the assumed height of the camera above the floor of e.g. the room may also be changed such that it does not match the true height, when performing the projection. This may be particularly interesting if e.g. wanting to change a perspective of the resulting image 104. In general, by having obtained knowledge (from the positions of the bottom portions of objects having moved across the horizontal surface) about what parts of the image 100 that corresponds to e.g. walls and to a floor, respectively, a three-dimensional model may be constructed which may then be used to perform the projection of the image 100 onto this three-dimensional model (such as the model 103). Exactly how the projection is then performed may vary based on e.g. a desired perspective, and on e.g. a desired viewpoint (e.g. a desired/assumed location of the camera vis-à-vis the horizontal surface.

The accuracy of the proposed method may of course depend on whether objects moving in the scene visit all parts of e.g. a floor or not. If no objects move across a particular part of the floor in the multiple images of the scene provided to the proposed method, the resulting three-dimensional model of the scene will likely be too small, and objects outside of the envisaged floor will appear warped. However, such effects can be reduced by analyzing more images of the scene, if assuming that the likelihood of each area of a floor being visited by at least one object increases with time. In addition, by also using keypoint detection as described above, true positions of bottom portions of the objects may be identified also in areas of the floor which are hidden from the camera, due to e.g. furniture or other objects being arranged between the floor and the camera. This further improves the chance of obtaining an accurate estimate of e.g. a true floor of a room.

An envisaged usage scenario is e.g. when multiple fisheye cameras are installed to cover a larger room or e.g. hallway, and where manual configuration of each camera would be substantially time-consuming. By use of the envisaged method, the cameras can be installed and then be allowed to each learn what parts of its images correspond to e.g. floors and walls. Each camera can then, based thereon, generate its own three-dimensional model of the part of the scene it is responsible for capturing, and then use this three-dimensional model to project its captured images in order to perform distortion correction.

It should also be noted that, as envisaged herein, the floor does not necessarily need to be square or rectangular, but can also have other shapes. For example, one or more walls of a room may be curved. Likewise, a wall does not necessarily need to meet another wall at a go-degree angle. The only assumption made is that the walls extend perpendicularly from the floor.

Figure 2A:
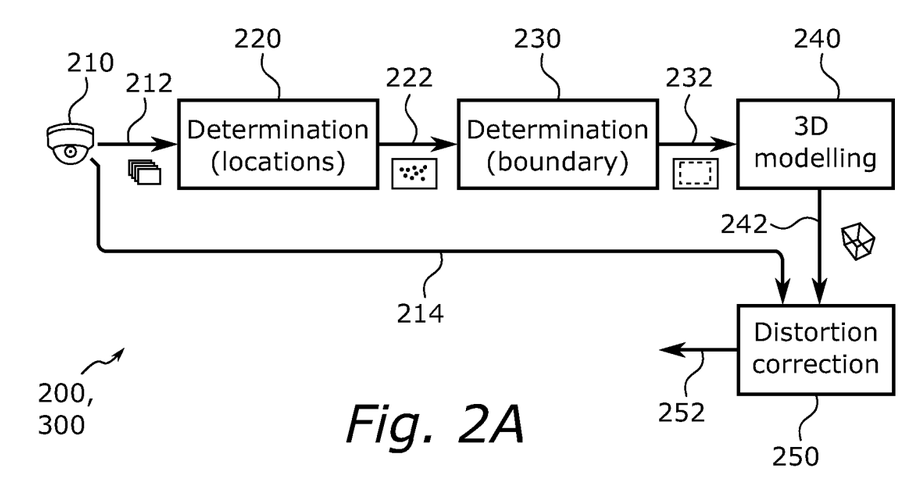
FIG. 2A schematically illustrates, using various functional units, various embodiments of a method and device according to the present disclosure.
Figure 2B:
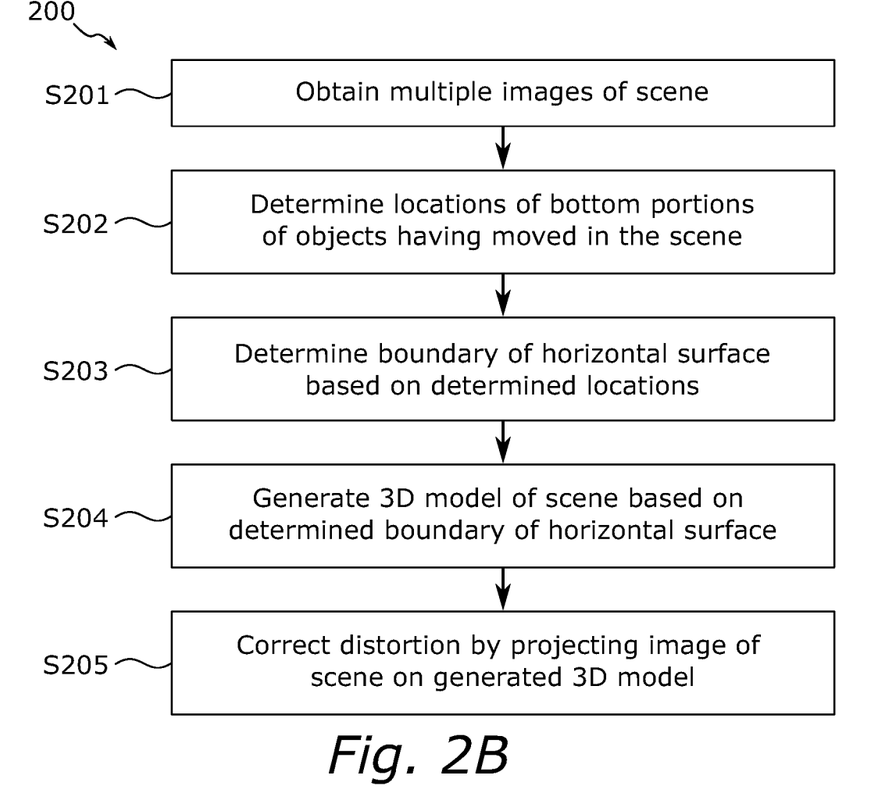
FIG. 2B schematically illustrates a flow of the method of FIG. 2A.

The envisaged method (such as illustrated previously with reference to FIGS. 1A to 1H) will now be described further with reference also to FIGS. 2A and 2B. FIG. 2A schematically illustrates, using various functional units, various embodiments of a method 200 for distortion correction as envisaged herein, while FIG. 2B schematically illustrates a flow of such a method. FIG. 2A also serves to illustrate an envisaged device 300 for performing the method, as will be described in more detail later herein with reference to FIGS. 3A to 3C.

In the method 200, a camera 210 is arranged to capture a scene (e.g. a room). The camera 210 has a non-rectilinear lens, such as e.g. a fisheye lens, such that a field-of-view of the camera 210 is sufficiently large for the camera 210 to capture a broader section of the scene. Multiple images 212 of the scene captured by the camera 210 are provided to a first determination module 220.

In a step S201, the first determination module 220 receives the multiple images 212 of the scene from the camera 210. The camera 210 may send the multiple images at once, or e.g. send one image at a time, e.g. as soon as each image is captured. The first determination module 220 is configured to estimate/determine (in a step S202) locations of bottom portions of one or more objects having moved over a horizontal surface in the scene. This may be performed e.g. by using keypoints, and/or from identifying the bottom portions of the one or more objects directly. For example, the first determination module 220 may e.g. be configured to identify feet of humans, feet of animals, and/or wheels of e.g. robotic vacuum cleaners or other objects which regularly move around across a floor of the scene. The identification of such bottom portions may e.g. be performed using commonly available technology for this purpose, and may e.g. be based on various machine learning algorithms trained to identify such features. Once a location of a bottom object in the scene has been determined, the first determination module 220 sends the estimated location 222 to a second determination module 230. The first determination module 220 may also wait until it has determined multiple locations of bottom portions, and then send these multiple locations to the second determination module 230 at a same time.

The second determination module 230 receives the multiple locations 222 of bottom portions from the first determination module 220, in order to gather statistics about how objects, and in particular their bottom portions, move in the scene over time. In particular, the second determination module 230 may focus on where the objects move, i.e. which part of the room their respective bottom portions visits. In a step S203, the second determination module 230 uses such statistics to determine/estimate a boundary of the floor of the room. Once the boundary of the floor of the room is determined, the second determination module 230 sends the determined boundary 232 to a 3D model module 240. In some embodiments, the second determination 230 module may wait until a number of bottom portions having moved in a particular area of the image exceeds a threshold value, before considering the particular area as a floor of the room. As mentioned earlier herein, this may improve a confidence in that the particular area is in fact part of a floor. As envisaged herein, "multiple bottom portions" may not necessarily mean bottom portions of different objects, but may also be one or more bottom portions of a same object repeatedly being identified as located in the particular area. More generally, it is not necessarily needed to differentiate between different objects, and a method capable of only identify a bottom portion (without also identifying to which particular object the bottom portion belongs) may thus also be used to implement the envisaged method.

The 3D modelling module 240 receives the determined boundary 232 from the second determination module 230, and is configured to generate (in a step S204) a three-dimensional model of the room captured by the camera 210 by defining one or more walls around the determined boundary of the floor. Once the three-dimensional model has been generated, the 3D modelling module 240 sends the three-dimensional model 242 to a correction module 250. The three-dimensional model may for example be defined by a plurality of coordinates representative of the boundary, and a plurality of coordinates representative of the walls. In other embodiments, the floor may e.g. be represented as a polygon, and the walls may be represented as e.g. just a height value h, if assuming that the walls have a height according to the height value and are such that they extend perpendicularly from the floor and along the boundary of the floor defined by the polygon. Other ways of representing/parametrize the three-dimensional model are of course also envisaged.

The correction module 250 receives the three-dimensional model 242 from the 3D modelling module 240, and performs (in a step S205) correction of a distortion of one or more images 214 captured by the camera 210 by projecting the one or more images onto the three-dimensional model received from the 3D modelling module 240. The one or more images (capturing a same room/scene) on which the correction module 250 applies the distortion may for example be received directly from the camera 210 as one or more images 214. In other embodiments, the one or more images on which distortion correction is to be made may e.g. be sent from any other module in possession of such images. After having corrected the distortion of at least one of the one or more images 242, the correction module 250 may e.g. output a corrected image 252. The corrected image 252 may e.g. be included as part of a video stream, and may e.g. replace the corresponding non-corrected image or be provided in addition to the non-corrected image. The image which is distortion corrected may not necessarily be a same image as one of those used to generate the three-dimensional model, but may instead be e.g. an image of the scene captured at a later instance than the multiple images used to generate the three-dimensional model.

A device for performing distortion correction of an image captured using a camera having a non-rectilinear lens will now be described in more detail with reference to FIGS. 3A to 3C.

Figure 3A:
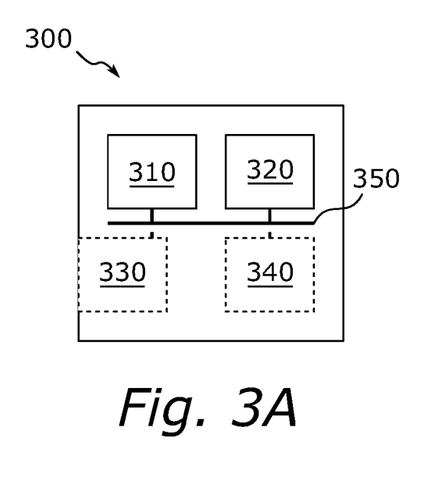
FIGS. 3A to 3C schematically illustrate various embodiments of a device according to the present disclosure.

FIG. 3A schematically illustrates, in terms of a number of functional units/modules/blocks, the components of various embodiments of a device 300 as envisaged herein. The device 300 includes processing circuitry 310. The processing circuitry 310 is provided using any combination of one or more of a suitable central processing unit (CPU), multi-processor, microcontroller, digital signal processor (DSP), etc., capable of executing software instructions stored in a computer program product (not illustrated herein), e.g. in form of a computer-readable storage medium 320. The processing circuit 61o may further be provided as at least one application specific integrated circuit (ASIC), or field-programmable gate array (FPGA).

Particularly, the processing circuitry 310 is configured to cause the device 300 to perform a set of operations, or steps, such as one or more of steps S201-S205 as disclosed above e.g. when describing the method 200 illustrated in FIGS. 2A and 2B. For example, the storage medium 320 may store a set of operations, and the processing circuitry 310 may be configured to retrieve the set of operations from the storage medium 320 to cause the device 300 to perform the set of operations. The set of operations may be provided as a set of executable instructions. Thus, the processing circuitry 310 is thereby arranged to execute methods as disclosed herein e.g. with reference to FIGS. 2A and 2B.

The storage medium 320 may also include persistent storage, which, for example, can be a memory in form of any single or combination of magnetic memory, optical memory, solid state memory or even remotely mounted memory.

The device 300 may further include a communications interface 330 for communications with other entities, functions, nodes, and devices, such as e.g. the camera 210. For example, the communications interface 330 may allow the device 300 to communicate with the camera 210 in order to receive the multiple images of the scene used to generate the three-dimensional model of the scene. As such, the communications interface 330 may include one or more transmitters and receivers, including analogue and/or digital components. As will be described in more detail later herein, the device 300 may in some embodiments be the camera 210 itself, and the communications interface 330 may e.g. include any necessary circuitry to e.g. allow the processing circuitry 310 of the device/camera 300 to access image data produced by an image sensor (not shown) of the device/camera 300.

The processing circuitry 310 controls the general operation of the device 300 e.g. by sending data and control signals to the communications interface 330 and the storage medium/memory 320, by receiving data and reports from the communications interface 330, and by retrieving data and instructions from the storage medium 320. Other components, as well as their related functionality, of the device 300 may of course also be included (as illustrated by the dashed box 340), but any description thereof is omitted in order not to obscure the concepts presented herein. A communications bus 350 is included and configured to allow the various units 310, 320 and 330 (and optionally also 340) to exchange data and information with each other as required.

Figure 3B:
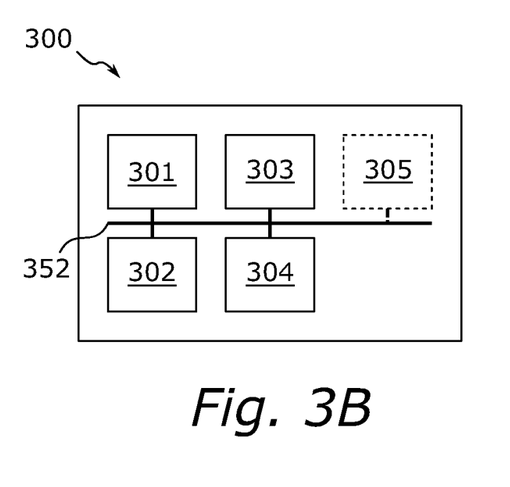

FIG. 3B schematically illustrates, in terms of a number of functional modules 301-305, the components of a device 300 according to various embodiments of the present disclosure. The device 300 includes at least a first determination module 301 configured to perform step S202 of the method 200 described with reference to FIGS. 2A and 2B (such as e.g. the first determination module 220), a second determination module 302 configured to perform step S203 (such as e.g. the second determination module 230), a 3D modelling module 303 configured to perform step S204 (such as e.g. the 3D modelling module 240), and a distortion correction module 304 configured to perform step S205 (such as e.g. the correction module 250).

In general terms, each functional module 301-304 may be implemented in hardware or in software. Preferably, one or more or all functional modules 301-304 may be implemented by the processing circuitry 310, possibly in cooperation with the communications interface 330 and/or the storage medium 320. The processing circuitry 310 may thus be arranged to from the storage medium 320 fetch instructions as provided by a functional modules 301-304, and to execute these instructions and thereby perform any steps of the method 200 performed by the device 300 as disclosed herein. If provided as hardware, each module 301-304 may be separate from the other modules. In other embodiments, one, more or all of the modules 310-304 may be implemented as parts of a same, physical module, or similar.

In some embodiments, the device 300 may further include additional functional modules (illustrated by the dashed box 305) as required to perform other tasks of the device 300, e.g. as defined by the accompanying dependent claims. A communications bus 352 (logical or physical) is provided to allow the various functional modules 301-304 (and optionally 305) to communicate/exchange data and information as required.

Figure 3C:
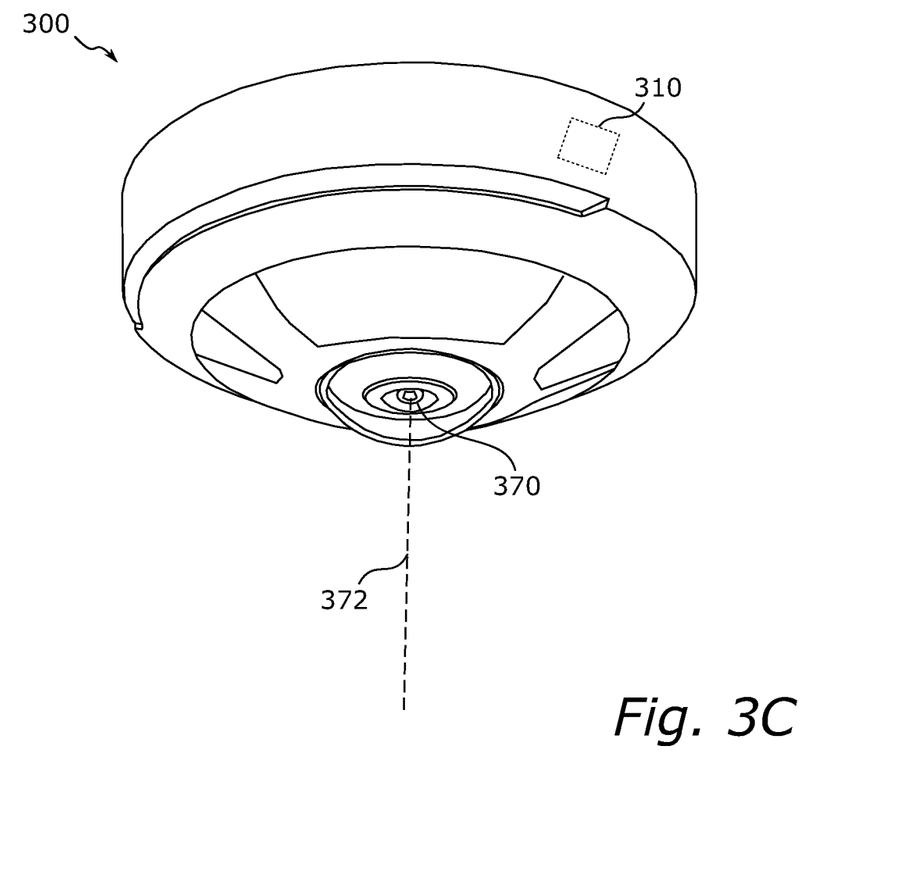

FIG. 3C schematically illustrates an embodiment of a camera 300 as envisaged herein, i.e. when the device 300 described with reference to FIGS. 3A and 3B is in fact the camera 300 used to capture the multiple images of the scene. As shown in FIG. 3A, in some embodiments, the camera 300 may be a fisheye camera having a fisheye lens 370. The camera 300 has an optical axis 372, such that when capturing an image of a scene, a point of the scene aligned with the optical axis 372 preferably corresponds to a pixel in the center of the captured image. As also shown in FIG. 3C, the camera 300 includes e.g. the processing circuitry 310 as described above, and may also include e.g. the memory (not shown) 320, and similar. The camera 300 is configured to be mounted in a ceiling of e.g. a room, such that the optical axis 372 is e.g. orthogonal to a floor of the room.

Although not illustrated in any drawings and Figures hereof, the present disclosure also provides a computer program and computer program product as already described herein. The computer program product includes a computer-readable storage medium on which the envisaged computer program is stored. As described already, the computer program includes computer code that, when run on processing circuitry (such as 310) of a device (such as 300), the computer code causes the device to perform any method disclosed and discussed herein, e.g. by executing the steps S201-S205 of the method 200 described with reference to FIGS. 2A and 2B. Consequently, the computer program and/or computer program product may thus provide the means for performing any steps of e.g. the method 200 and/or to make the envisaged device 300 operate as intended.

The computer program product can be provided for example as an optical disc, such as a CD (compact disc) or a DVD (digital versatile disc) or a Blu-Ray disc. The computer program product could also be embodied as a memory, such as a random-access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, the computer program can be stored in any way which is suitable for the computer program product, i.e. on the computer-readable storage medium.

In summary of the various embodiments presented herein, the present disclosure provides an improved way of handling distortion correction in images captured by cameras having non-rectilinear lenses. In particular, the present disclosure provides a way of self-learning such a correction by observing how, or in particular where, bottom portions of objects (such as feet of humans) move in images of a scene, in order to determine what parts of an image of the scene that correspond to e.g. a floor of a room, and which other parts of the image that correspond to e.g. walls of the room, in order to generate a three-dimensional model which can be used to perform the correction. By allowing e.g. a camera to learn, over time, how to generate such a three-dimensional model, distortion in images captured by the camera may be corrected without requiring manual input from e.g. an operator, thus facilitating e.g. a process of installing multiple such cameras.

Although features and elements may be described above in particular combinations, each feature or element may be used alone without the other features and elements or in various combinations with or without other features and elements. Additionally, variations to the disclosed embodiments may be understood and effected by the skilled person in practicing the claimed invention, from a study of the drawings, the disclosure, and the appended claims.

In the claims, the words "comprising" and "including" does not exclude other elements, and the indefinite article "a" or "an" does not exclude a plurality. The mere fact that certain features are recited in mutually different dependent claims does not indicate that a combination of these features cannot be used to advantage.

LIST OF REFERENCE NUMERALS 100 image of scene
101; 212 multiple images of scene
102, 103; 242 three-dimensional models of scene
104; 252 distortion corrected image of scene
110; 171 horizontal surface/floor
120a-d; 172a-d vertical surfaces/walls
130a-d; 174a-d corners
140 door
150; 222 locations of bottom portions of objects in scene over time
160 boundary of bottom portions
170; 232 boundary of horizontal surface
200 method of distortion correction
S201-S205 method steps
210 camera having non-rectilinear lens
212 multiple images of scene
220; 301 first determination module
230; 302 second determination module
240; 303 3D modelling module
250; 304 correction module
300 device/camera
305; 340 optional functional modules
310 processing circuitry
320 memory
330 communications interface
350, 352 communications bus(es)
370 fisheye lens
372 optical axis

The invention claimed is:

1. A method of distortion correction in an image of a scene captured by a camera having a non-rectilinear lens, including:
   i) obtaining multiple images of the scene captured by the camera over time;
   ii) determining where bottom portions of one or more objects having moved over a horizontal surface in the scene are located in at least some of the multiple images;
   iii) determining a boundary of the horizontal surface in the scene based on the determined locations of the bottom portions;
   iv) generating a three-dimensional model of the scene by defining one or more vertical surfaces around the determined boundary of the horizontal surface of the scene, and v) correcting a distortion of at least one of the multiple images by projecting at least one image of the multiple images onto the three-dimensional model of the scene.

2. The method according to claim 1, wherein the non-rectilinear lens is a fisheye lens.

3. The method according to claim 1, wherein the bottom portions include feet of the objects.

4. The method according to claim 1, wherein determining where bottom portions of one or more objects have moved further includes identifying one or more keypoints of the one or more objects.

5. The method according to claim 1, wherein the scene is of a room, and wherein the horizontal surface of the scene is the floor of the room.

6. The method according to claim 1, wherein at least some of the multiple images are captured during a training period, and wherein an area of said at least some of the multiple images is considered to belong to the horizontal surface of the scene if a number of bottom portions having moved in the area during a finite time interval exceeds a threshold value.

7. The method according to claim 1, wherein the three-dimensional model includes a horizontal surface bounded by the determined boundary, and wherein the one or more vertical surfaces project in a direction perpendicular to said horizontal surface.

8. A device for distortion correction in an image of a scene captured by a camera having a non-rectilinear lens, the device including processing circuitry configured to cause the device to:
   i) obtain multiple images of the scene captured by the camera over time;
   ii) determine where bottom portions of one or more objects having moved over a horizontal surface in the scene are located in at least some of the multiple images;
   iii) determine a boundary of the horizontal surface in the scene based on the determined locations of the bottom portions;
   iv) generate a three-dimensional model of the scene by defining one or more vertical surfaces around the determined boundary of the horizontal surface of the scene, and
   v) correct a distortion of at least one of the multiple images by projecting the at least one image onto the three-dimensional model of the scene.

9. The device according to claim 8, wherein the non-rectilinear lens is a fisheye lens.

10. The device according to claim 8, wherein the bottom portions include feet of the objects.

11. The device according to claim 8, wherein determining where bottom portions of one or more objects having moved further includes identifying one or more keypoints of the one or more objects.

12. The device according to claim 8, wherein the scene is of a room, and wherein the horizontal surface of the scene is the floor of the room.

13. The device according to claim 8, wherein at least some of the multiple images are captured during a training period, and wherein an area of said at least some of the multiple images is considered to belong to the horizontal surface of the scene if a number of bottom portions having moved in the area during a finite time interval exceeds a threshold value.

14. The device according to claim 8, wherein the three-dimensional model includes a horizontal surface bounded by the determined boundary, and wherein the one or more vertical surfaces project in a direction perpendicular to said horizontal surface.

15. The device according to claim 8, wherein the device is the camera having the non-rectilinear lens.

16. A non-transitory computer readable storage medium having stored thereon a computer program for distortion correction in an image of a scene captured by a camera having a non-rectilinear lens, wherein the computer program includes computer code that, when running on processing circuitry of a device, causes the device to:
   i) obtain multiple images of the scene captured by the camera over time;
   ii) determine where bottom portions of one or more objects having moved over a horizontal surface in the scene are located in at least some of the multiple images;
   iii) determine a boundary of the horizontal surface in the scene based on the determined locations of the bottom portions;
   iv) generate a three-dimensional model of the scene by defining one or more vertical surfaces around the determined boundary of the horizontal surface of the scene, and
   v) correct a distortion of at least one of the multiple images by projecting the at least one image onto the three-dimensional model of the scene.

* * * * *